United States Patent
Nancekievill

(10) Patent No.: US 7,836,288 B2
(45) Date of Patent: Nov. 16, 2010

(54) BRANCH PREDICTION MECHANISM INCLUDING A BRANCH PREDICTION MEMORY AND A BRANCH PREDICTION CACHE

(75) Inventor: Alexander Edward Nancekievill, Cambridge (GB)

(73) Assignee: ARM Limited, Cambridge (GB)

( * ) Notice: Subject to any disclaimer, the term of this patent is extended or adjusted under 35 U.S.C. 154(b) by 1251 days.

(21) Appl. No.: 10/939,992

(22) Filed: Sep. 14, 2004

(65) Prior Publication Data

US 2006/0095747 A1    May 4, 2006

(51) Int. Cl.
*G06F 9/00* (2006.01)
(52) U.S. Cl. .................. 712/239; 712/240; 712/234; 712/237
(58) Field of Classification Search ............. 712/240, 712/239
See application file for complete search history.

(56) References Cited

U.S. PATENT DOCUMENTS

| 6,253,316 | B1 * | 6/2001 | Tran et al. ............. 712/239 |
| 6,425,075 | B1 * | 7/2002 | Stiles et al. ............ 712/239 |
| 6,502,188 | B1 * | 12/2002 | Zuraski et al. ........... 712/234 |
| 6,553,488 | B2 * | 4/2003 | Yeh et al. .............. 712/239 |
| 6,571,331 | B2 * | 5/2003 | Henry et al. ............ 712/239 |
| 6,640,298 | B1 * | 10/2003 | Totsuka et al. .......... 712/239 |
| 6,766,441 | B2 * | 7/2004 | Sinharoy ............... 712/237 |
| 7,024,545 | B1 * | 4/2006 | Zuraski et al. ........... 712/240 |
| 7,165,168 | B2 * | 1/2007 | McDonald .............. 712/238 |
| 7,243,219 | B2 * | 7/2007 | Jourdan et al. .......... 712/239 |
| 7,266,676 | B2 * | 9/2007 | Tran et al. .............. 712/238 |
| 7,493,480 | B2 * | 2/2009 | Emma et al. ............ 712/240 |
| 2004/0210749 | A1 * | 10/2004 | Biles .................. 712/240 |
| 2006/0036837 | A1 * | 2/2006 | Stark et al. ............. 712/239 |
| 2006/0095749 | A1 * | 5/2006 | Nancekievill ........... 712/240 |
| 2006/0095750 | A1 * | 5/2006 | Nye et al. .............. 712/240 |

* cited by examiner

*Primary Examiner*—Eddie P Chan
*Assistant Examiner*—Idriss N Alrobaye
(74) *Attorney, Agent, or Firm*—Nixon & Vanderhye P.C.

(57) ABSTRACT

A data processing system 2 incorporating an instruction pipeline 14 and a prefetch unit 16 is provided with a branch prediction mechanism using both a branch prediction memory 20 storing 1-bit values indicating strongly taken or strongly not taken together with a branch prediction cache indicating for certain selected branch history values either weakly taken or weakly not taken predictions. When a conditional branch instruction is encountered, then the preceding branch prediction history is used to access a first prediction within the branch prediction memory 20 and is looked up to check for a hit within the branch prediction cache 22. If a hit occurs, then a second prediction within the branch prediction cache 22 is used in preference to the first prediction, otherwise the first prediction is used. The misprediction by a first prediction value stored within the branch prediction memory 20 triggers a second prediction to be cached within the branch prediction cache 22 corresponding to that mispredicted history value.

18 Claims, 5 Drawing Sheets

BRANCH PREDICTION MECHANISM INCLUDING A BRANCH PREDICTION MEMORY AND A BRANCH PREDICTION CACHE

BACKGROUND OF THE INVENTION

1. Field of the Invention

This invention relates to the field of data processing systems. More particularly, this invention relates to pipelined data processing systems including branch prediction mechanisms.

2. Description of the Prior Art

It is known to provide pipelined data processing systems including a sequence of pipelined stages respectively performing different parts of the overall execution of program instructions as they progress through the different pipeline stages. Within such pipelined systems, program instructions are fetched and start to progress along the pipeline before those instructions preceding them in the pipeline have completed their execution. This results in a problem in the case of conditional branch instructions since it is not determined until those instructions have reached a relatively late stage within the pipeline whether or not the branch will be taken or not taken. Accordingly, the sequence of program instructions to be fetched into the pipeline following the conditional branch instruction can change.

In order to deal with this problem it is known to provide branch prediction mechanisms which seek to predict whether or not a particular conditional branch instruction will be taken. The consequences of misprediction are relatively severe as it is then necessary to flush the pipeline, reload the corrected sequence of program instructions and restart execution at the cost of many processor cycles. Accordingly, sophisticated and often multiple branch prediction mechanisms may be included within high performance systems with the aim of increasing branch prediction accuracy.

One known form of branch prediction mechanism learns patterns of branch behavior; using a history of recent branch outcomes to predict what will happen next. For this type of branch prediction mechanism it is known to store multiple prediction levels associated with each branch to be predicted indicating, for example, whether that branch is predicted as strongly taken, weakly taken, weakly not taken or strongly not taken. This form of prediction storage provides a degree of hysteresis in the prediction thereby preventing the predictions from being too rapidly perturbed by relatively infrequent mispredictions. A disadvantage of storing such multiple levels of prediction for each branch is the associated circuit area, power consumption, complexity etc. A second disadvantage is that the hysteresis increases the time it takes the predictor to learn a new pattern of branch behavior, on a task switch for example.

It is desirable to provide branch prediction mechanisms with a high degree of accuracy and yet which add a relatively low level of additional circuit overhead. This is particularly the case in the context of embedded systems in which overhead in terms of circuit area and power consumption is critical.

SUMMARY OF THE INVENTION

Viewed from one aspect the present invention provides apparatus for processing data, said apparatus comprising:

a pipelined processing circuit operable to execute program instructions including conditional branch instructions generating branch outcomes; and a branch prediction circuit operable to generate predictions of branch outcomes of conditional branch program instructions to be executed by said pipelined processing circuit; and a prefetch circuit operable to supply a stream of program instructions to said pipelined processing circuit for execution in dependence upon said predictions; wherein said branch prediction circuit comprises:

a branch history register operable to store a branch history value indicative of a preceding sequence of branch outcomes;

a branch prediction memory having prediction memory storage locations addressed in dependence upon at least said branch history value, a prediction memory storage location addressed by a given branch history value being operable to store a first prediction of a branch outcome as either branch taken or branch not taken for a next branch instruction following a given preceding sequence of branch outcomes corresponding to said given branch history value; and a branch prediction cache operable to store at least one branch history value together with a second prediction of a branch outcome for a next branch instruction following a preceding sequence of branch outcomes corresponding to said branch history value;

a branch prediction selector operable to select for use by said prefetch circuit for a given history value either a second prediction when said branch prediction cache contains a second prediction for said given history value or a first prediction when said branch prediction cache does not contain a second prediction for said given history value; and a prediction updating circuit operable in response to detection of an incorrect prediction based upon said first prediction from said branch prediction memory for said given history value to store said given history value into said branch prediction cache together with a second prediction for said given history value.

The present technique recognizes that for a large proportion of branches to be predicted a simple prediction of taken or not taken may be sufficient and may be provided with a relatively low circuit overhead within a branch prediction memory. A relatively smaller number of branches for which a misprediction occurs can have a further prediction value stored within a branch prediction cache and used in preference to a prediction within a branch prediction memory when available. Thus, for example, the branch prediction memory may store a simple strongly taken or strongly not taken prediction whilst the branch prediction cache can store an indication of weakly taken or weakly not taken for those branches having their identifying preceding history values stored within the branch prediction cache. This provides an advantageous increase in branch prediction accuracy coupled with a relatively low circuit overhead. The cache prediction overrides the branch prediction memory prediction such that if a cache eviction removes a cache entry before it used, the net effect is as though no additional cache prediction system existed. This means that, compared to a system in which a multi-level branch prediction is stored for each branch, the present system is able to more rapidly learn and respond to system changes which change the branch predictions (e.g. program context switches). After such a change a great many mispredicts are likely which flood the branch prediction cache so that behavior reverts to that of the branch prediction memory alone. Since the branch prediction memory, storing its simple branch taken or branch not taken prediction, has low hysteresis it rapidly adapts to the new branch outcomes. Thus, the branch prediction cache provides a degree of hysteresis for those branches which benefit from such a feature whereas when a major change occurs in which the majority of branch predictions need to be changed the branch prediction memory with its low hysteresis is able to respond and learn the new predictions more rapidly.

The second prediction stored within the branch prediction cache upon detection of a misprediction is advantageously the same as that which resulted in the misprediction. Whilst this may appear to be incorrect, it does provide a degree of hysteresis in that it stops the prediction which will be used changing straight away in response to a single misprediction. More particularly, when a misprediction occurs based upon a second prediction from the branch prediction cache, then that second prediction is changed within the branch prediction cache. This combination of first storing the original prediction upon the cache entry being made and then subsequently storing a changed prediction when a further misprediction occurs effectively provides the prediction hysteresis in the case of cached entries, i.e. weak levels of prediction indicated by the second predictions within the cache coupled with strong levels of prediction indicated by the first predictions within the branch prediction memory.

Preferably the first prediction in the branch prediction memory is updated and changed whenever a misprediction occurs. Thus, the branch prediction memory can predict and be updated entirely independently of the status of the branch prediction cache.

Whilst it is possible that the branch prediction cache may include only a single cache line, in preferred embodiments a plurality of cache lines are provided. A balance may be struck for each particular design off-setting the storage space savings within the branch prediction memory against the circuit consumed by the provision of the branch prediction cache.

In preferred embodiments the branch prediction cache includes valid bits to indicate which cache lines are storing valid data. After a successful second prediction entries are removed from the cache by clearing the valid bit.

Storage space within the branch prediction memory can be saved by using a single bit to store the first prediction compared to two bits for the prior art approach.

The second prediction stored within the branch prediction cache may similarly be stored using a single bit since the presence of the corresponding prediction history value within the cache effectively encodes the weak nature of the prediction.

Whilst a variety of cache prediction mechanisms may be used for the branch prediction cache, an advantageously simple and yet reasonable effective prediction selection mechanism is round-robin.

Viewed from another aspect the present invention provides a method of processing data, said method comprising:

executing program instructions including conditional branch instructions generating branch outcomes with a pipelined processing circuit; and generating predictions of branch outcomes of conditional branch program instructions to be executed by said pipelined processing circuit with a branch prediction circuit; and supplying a stream of program instructions to said pipelined processing circuit for execution in dependence upon said predictions with a prefetch circuit; wherein said step of prediction comprises:

storing a branch history value indicative of a preceding sequence of branch outcomes;

addressing prediction memory storage locations within a branch prediction memory in dependence upon at least said branch history value, a prediction memory storage location addressed by a given branch history value being operable to store a first prediction of a branch outcome for a next conditional branch instruction following a given preceding sequence of branch outcomes corresponding to said given branch history value;

storing within a branch prediction cache at least one branch history value together with a second prediction of a branch outcome for a next conditional branch instruction following a preceding sequence of branch outcomes corresponding to said branch history value;

selecting for use by said prefetch circuit for a given history value either a second prediction when said branch prediction cache contains a second prediction for said given history value or a first prediction when said branch prediction cache does not contain a second prediction for said given history value; and in response to detection of an incorrect prediction based upon said first prediction from said branch prediction memory for said given history value, storing said given history value into said branch prediction cache together with a second prediction for said given history value.

The above, and other objects, features and advantages of this invention will be apparent from the following detailed description of illustrative embodiments which is to be read in connection with the accompanying drawings.

BRIEF DESCRIPTION OF THE DRAWINGS

An embodiment of the invention will now be described by way of example only, with reference to the accompanying drawings in which.

DESCRIPTION OF THE PREFERRED EMBODIMENTS

Figure 1:
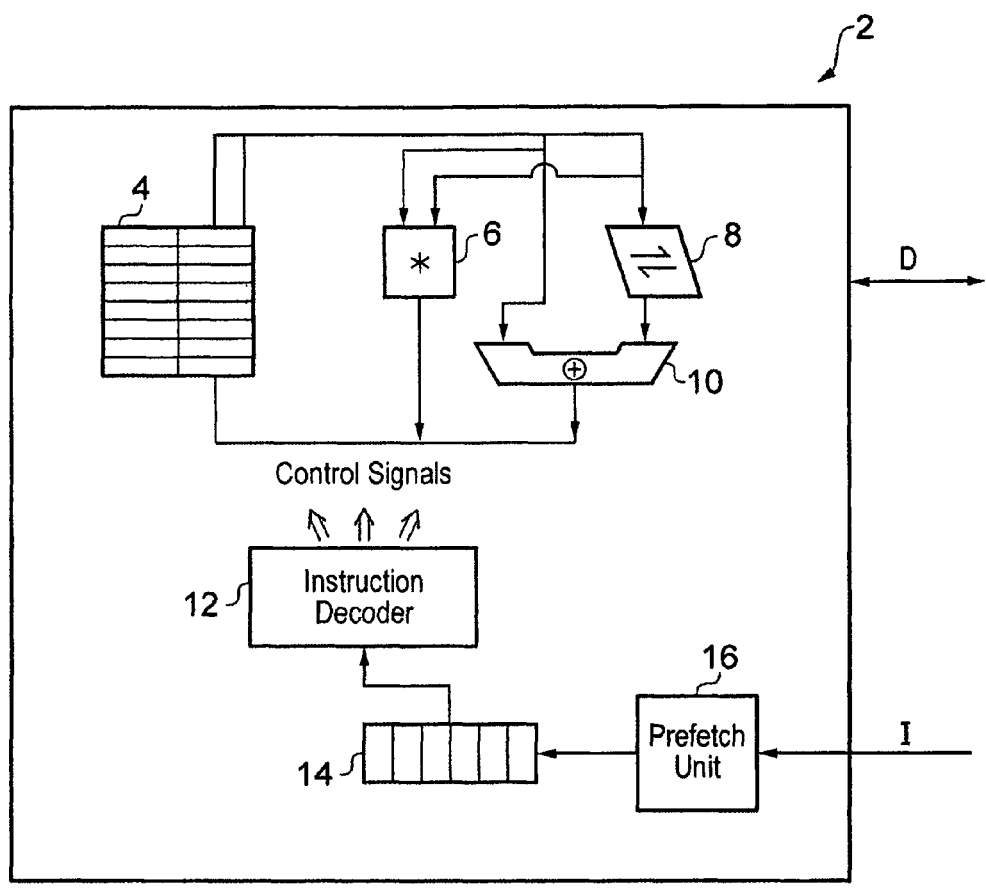
FIG. 1 schematically illustrates a pipelined data processing system.

FIG. 1 illustrates a data processing system 2, such as an embedded data processing core. The data processing system 2 as illustrated includes a register bank 4, a multiplier 6, a shifter 8, an adder 10, an instruction decoder 12, an instruction pipeline 14 and a prefetch unit 16. It will be appreciated that in practice the data processing system 2 will incorporate many more circuit elements. The circuit elements illustrated in FIG. 1 have been simplified and illustrate how instructions I are fetched by the prefetch unit 16 and then supplied to the instruction pipeline 14. Program instructions within the instruction pipeline 14 control an instruction decoder 12 which then generates control signals which configure the register bank 4, the multiplier 6, the shifter 8 and the adder 10 to perform desired data processing operations.

Figure 2:
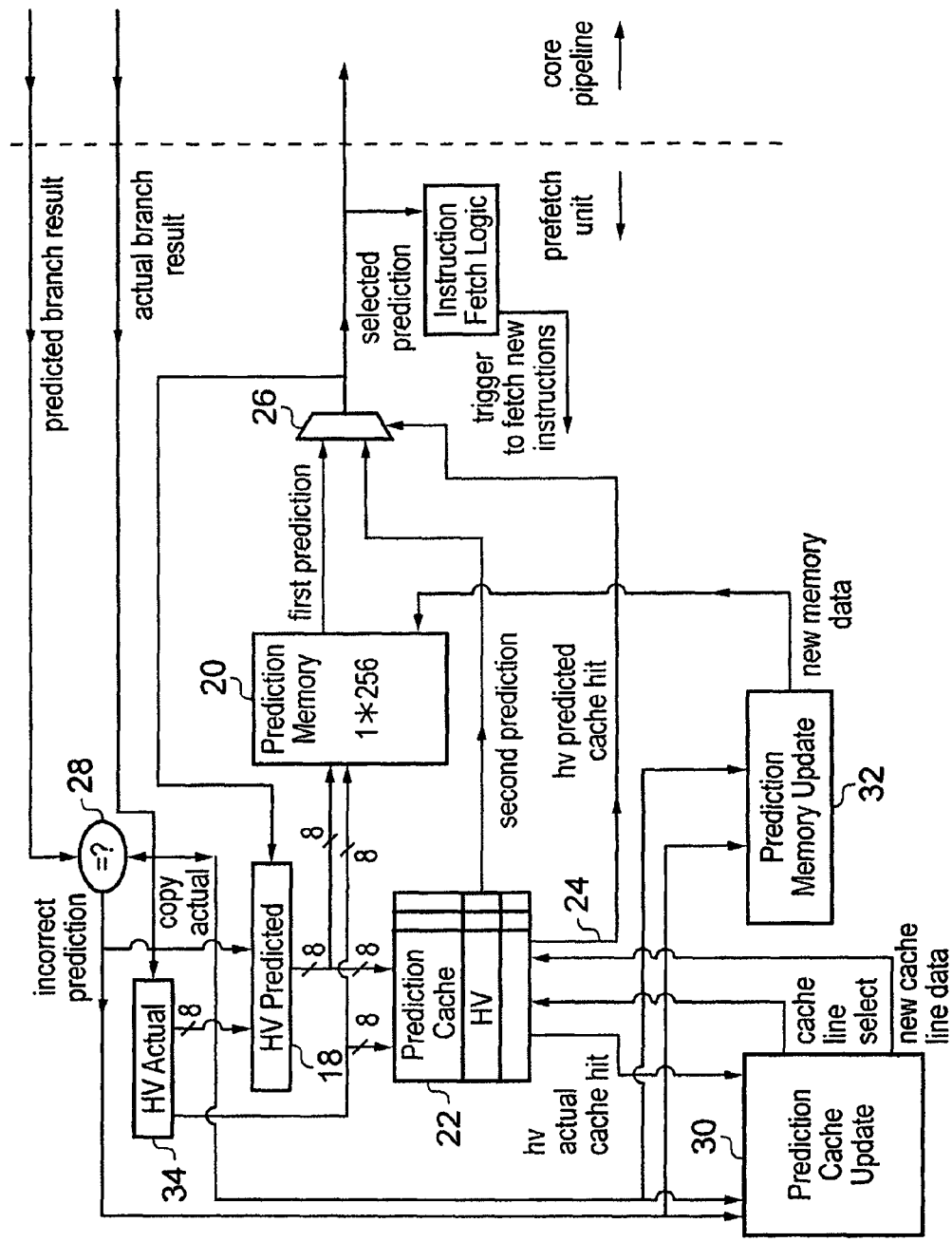
FIG. 2 schematically illustrates a branch prediction mechanism within a prefetch unit.

FIG. 2 illustrates a portion of the prefetch unit 16 dealing with branch prediction. A predicted history value register 18 serves to store a multi-bit value indicating the predictions of taken or not taken that have been made for a predetermined number of preceding conditional branch instructions that have been encountered. Whilst this predicted history value register 18 could have a variety of sizes, a preferred example striking a reasonable balance between circuit overhead and accuracy is one in which an 8-bit history value is used. Each bit within the history value indicates whether the corresponding branch was either taken (1) or not taken (0). When a new conditional branch instruction is encountered within the instruction stream, a prediction as to whether or not that newly encountered provisional branch instruction will be taken is looked up on the basis of the preceding pattern of taken or not taken branches as stored within the predicted history value register 18. In the circuit of FIG. 2, this predicted history value is used to address a branch prediction memory 20 which has a 1-bit storage location for each possible predicted history value. The predicted history value is also looked up within a branch prediction cache 22, which may or may not be currently storing a prediction for that particular predicted history value. If a predicted history value cache hit within the branch prediction cache 22 occurs, then this is indicated on hit signal line 24 which controls a prediction selection multiplexer 26 to select a second prediction as stored within the branch prediction cache 22 to be output from the prefetch unit 16 to the instruction pipeline 14. If no cache hit occurs within the branch prediction cache as indicated on hit signal line 24, then the prediction selection multiplexer 26 instead passes the first prediction read from the branch prediction memory 20 out to the core pipeline for use. The selected prediction is fed back to the predicted history value register 18 where it is used to update the predicted history value using a shift in operation (1-bit being lost from the end) with the modified predicted history value then being used as an index to access a prediction for the next conditional branch instruction which is encountered.

The branch prediction memory 20 has 256 1-bit storage locations each corresponding to a possible predicted history value and storing a bit indicative of a strongly taken or a strongly not taken prediction to be used as the first prediction when a second prediction is not available. Each cache line within the branch prediction cache 22 stores an 8-bit history value which can be compared with the predicted history value stored within the predicted history value register 18 to detect a cache hit. Additionally, each cache line stores a valid bit indicating whether or not that cache line is storing valid data together with a prediction bit which provides the second prediction that is used in preference to the first prediction when available. The branch prediction cache 22 is initialized with all of the valid bits indicating invalid.

The selected prediction output from the prediction selection multiplexer 26 and passed to the instruction pipeline 14 is also used to direct the prefetch unit to select an appropriate stream of program instructions to be fed into the instruction pipeline 14. The prediction made is passed along the pipeline together with those instructions and at the point when the condition for the conditionally branch inspection has been evaluated a determination can be made as to the actual branch result. This is passed back to the prefetch unit 16 together with the predicted branch result which was previously made and these are compared within a comparator 28. If they do not match, then this indicates an incorrect prediction has occurred. Consequences such as pipeline flushing and restarting will be triggered by the incorrect prediction detection in the normal way and will be familiar to those in this technical field. Such consequences to the instruction pipeline will accordingly not be further described herein.

The occurrence of the correct prediction is also used to update the branch prediction data held within the branch prediction memory 20 and the branch prediction cache 22. Illustrated in FIG. 2 are a prediction cache update circuit 30 and a prediction memory update circuit 32 responsible for respectively updating the branch prediction cache 22 and the branch prediction memory 20. It will be appreciated that these may be provided separately or in a combined form depending upon the particular circumstances.

A actual branch history value register 34 within the prefetch unit 16 is responsive to the actual branch results fed back to maintain an 8-bit actual history value corresponding to the actual conditional branch instruction results which occur within the instruction pipeline 16. It will be appreciated that this history value is time-shifted relative to the predicted history value within the predicted history value register 18. Nevertheless this actual history value within the actual history value register 34 is used to access and update the entries within the branch prediction memory 20 and the branch prediction cache 22 when a misprediction is detected. It is also used to correct the predicted history value register 18 as necessary.

The branch prediction memory update circuit 32 is responsive to signals indicating an incorrect prediction together with the actual branch result to generate new memory data which is written into the branch prediction memory 20 at the 1-bit memory storage location addressed by the value stored within the actual history value register 34 prior to the newly received actual branch result being updated into that actual history value register 34. This update occurs once the correction of the prediction data in the branch prediction memory and the branch prediction cache 22 has occurred. Thus, in respect of the branch prediction memory 20, an incorrect prediction directly results in a change of the first prediction value stored therein for the history value corresponding to that incorrect prediction and thus changes the first prediction from indicating strongly in one direction to strongly in the other direction.

The action of the branch prediction cache update circuit 30 in response to a detected incorrect prediction differs depending upon whether or not the history value corresponding to the value stored within the actual history value register 34 is currently cached within the branch prediction cache 22. If such a value is present, then this indicates that it will have been used for the prediction which is now being indicated as incorrect and accordingly the second prediction value stored as a 1-bit value within that cache line yielding the hit against the actual history value should be changed to point in the other direction. If the history value within the actual history value register 34 does not yield a hit within the branch prediction cache 22, then this indicates that the misprediction which has been detected was based upon a first prediction value read from a corresponding location within the branch prediction memory 20 and that a new cache line entry should be made within the branch prediction cache. This new cache line entry is made into a victim cache line which is selected in dependence upon a round-robin algorithm in accordance with normal round-robin victim selection techniques. Into that selected cache line is written the history value stored within the actual history value register 34 together with a second prediction value corresponding to the first prediction value which resulted in the misprediction which has been detected. The valid bit for that cache line is also set to indicate that the cache line is storing valid data. In this case, the cache line is still indicating the same direction as the branch prediction memory but the presence within the branch prediction cache 22 of the cache line represents that this is a weak indication rather than a strong indication. The weak indications are used in preference to any strong indications when they are available and should the weak indication result in another misprediction, then it will be altered as indicated in the previous discussion.

Figure 3:
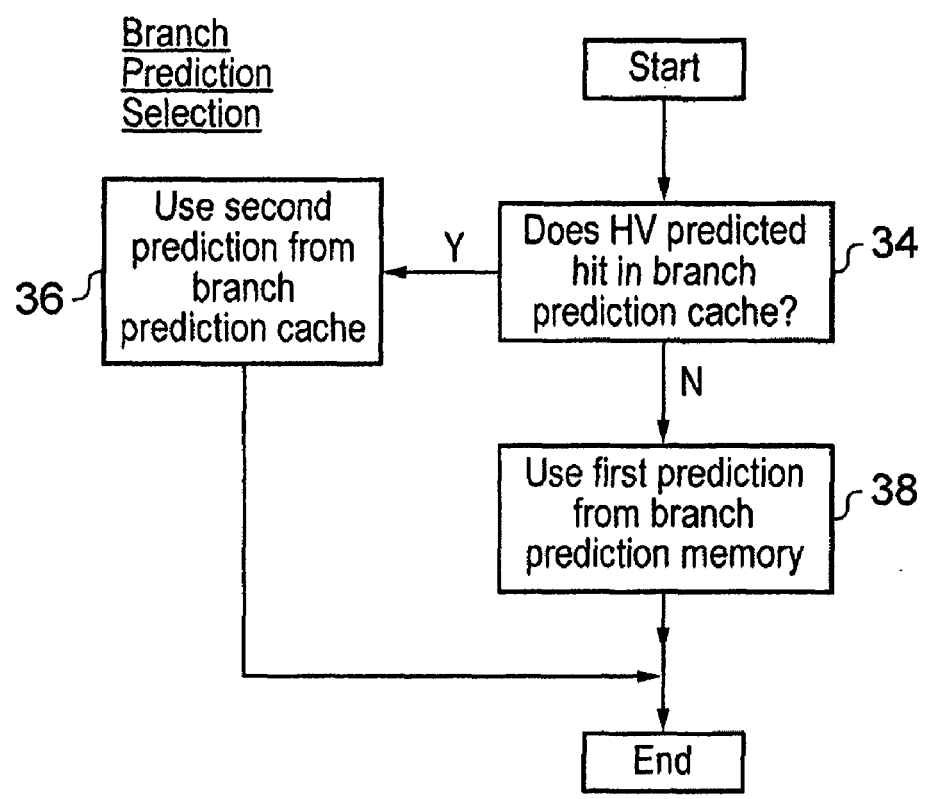
FIG. 3 is a flow diagram schematically illustrating branch prediction selection.

FIG. 3 schematically illustrates a flow diagram showing how branch prediction selection is made. At step 34 a conditional branch instruction is detected as entering the instruction pipeline 14 and a look up is made for the existing predicted history value stored within the predicted history value register 18 to see if this hits within the branch prediction cache 22. If a hit occurs, then step 36 uses the second prediction as stored within the branch prediction cache 22. If a hit does not occur, then the first prediction as stored within the branch prediction memory 20 is used at step 38.

Figure 4:
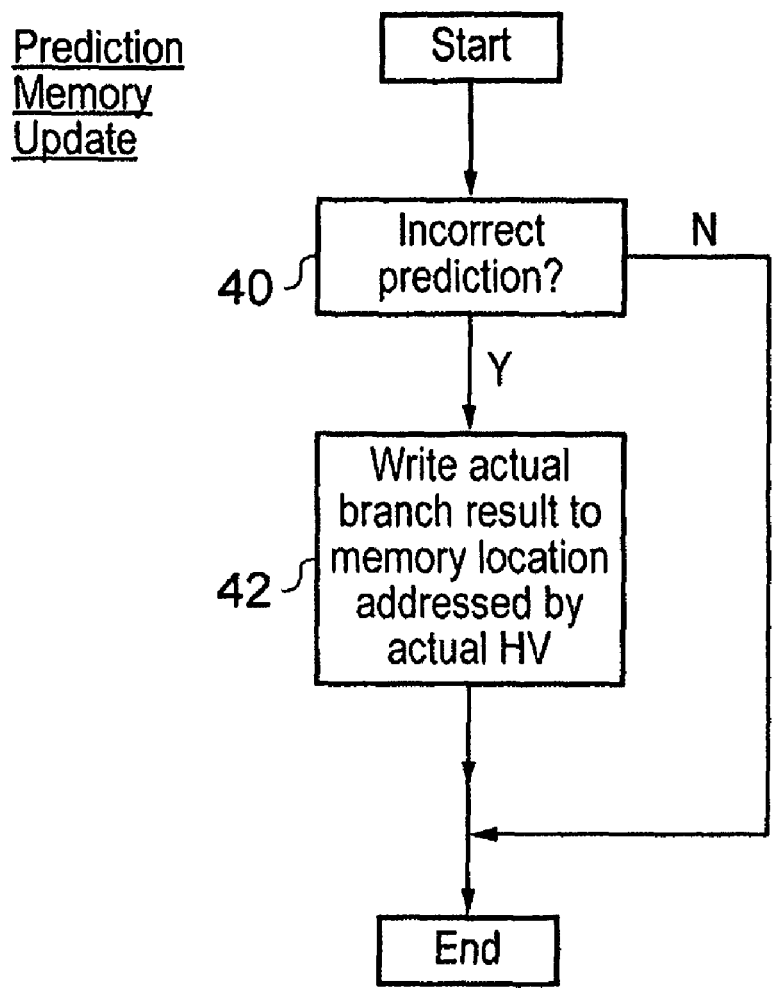
FIG. 4 is a flow diagram schematically illustrating prediction memory update.

FIG. 4 schematically illustrates a flow diagram illustrating how the prediction memory is updated when an incorrect prediction is detected. At step 40 an incorrect prediction is detected. Step 42 then writes the correct actual branch result into the location within the branch prediction memory 20 addressed by the actual history value stored within the actual history value register 34. This results in an immediate change in the first prediction value and accordingly rapid learning within the predictions stored within the branch prediction memory 20.

Figure 5:
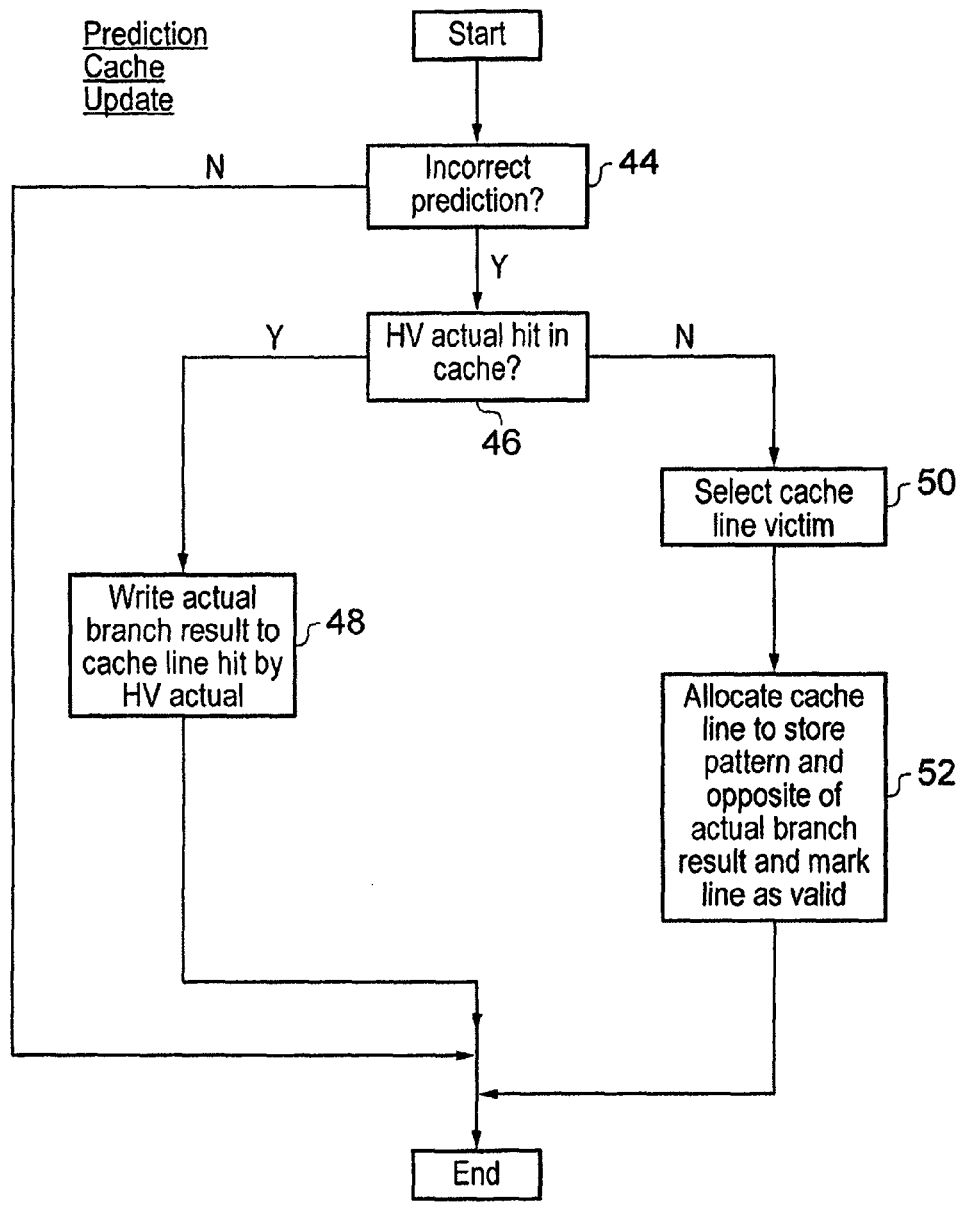
FIG. 5 is a flow diagram schematically illustrating prediction cache update.

FIG. 5 schematically illustrates a flow diagram illustrating prediction cache updating. At step 44, when an incorrect prediction is detected, then processing proceeds to step 46 at which it is determined whether a hit is detected within the branch prediction cache 22 corresponding to the actual history value stored within the actual history value register 34. If a hit does occur, then step 48 serves to write the actual branch result which has been returned to the cache line which has been hit within the branch prediction cache 22. If no hit is detected as step 46, then step 50 uses a round-robin algorithm to select a cache line victim within the branch prediction cache 22 and then step 52 serves to write a second prediction value opposite to the actual branch prediction result returned into the selected victim cache line and marks the cache line as valid.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:
   a pipelined processing circuit operable to execute program instructions including conditional branch instructions generating branch outcomes; and
   a branch prediction circuit operable to generate predictions of branch outcomes of conditional branch program instructions to be executed by said pipelined processing circuit; and
   a prefetch circuit operable to supply a stream of program instructions to said pipelined processing circuit for execution in dependence upon said predictions; wherein said branch prediction circuit comprises:
      a branch history register operable to store a branch history value indicative of a preceding sequence of branch outcomes;
      a branch prediction memory having prediction memory storage locations addressed in dependence upon at least said branch history value, a prediction memory storage location addressed by a given branch history value being operable to store a first prediction of a branch outcome as either branch taken or branch not taken for a next branch instruction following a given preceding sequence of branch outcomes corresponding to said given branch history value; and
      a branch prediction cache for storing at least one branch history value together with a second prediction of a branch outcome for a next branch instruction following a preceding sequence of branch outcomes corresponding to said branch history value;
      a branch prediction selector operable to select for use by said prefetch circuit for a given history value either a second prediction when said branch prediction cache contains a second prediction for said given history value or a first prediction when said branch prediction cache does not contain a second prediction for said given history value; and
      a prediction updating circuit operable in response to detection of an incorrect prediction based upon said first prediction from said branch prediction memory for said given history value to store said given history value into said branch prediction cache together with a second prediction for said given history value.

2. Apparatus as claimed in claim 1, wherein said second prediction initially stored within said branch prediction cache together with said given history value produces the same branch taken or branch not taken as said first prediction stored within said branch prediction memory which led to said incorrect prediction.

3. Apparatus as claimed in claim 1, wherein said prediction updating circuit is operable in response to detection of an incorrect prediction based upon said second prediction from said branch prediction cache for said given history value to change said second prediction for said given history value.

4. Apparatus as claimed in claim 1, wherein said prediction updating circuit is operable in response to detection of an incorrect prediction based upon said first prediction from said branch prediction memory for said given history value to change said first prediction for said given history value.

5. Apparatus as claimed in claim 1, wherein said branch prediction cache comprises a plurality of cache storage lines each operable to store a history value together with a corresponding second prediction.

6. Apparatus as claimed in claim 5, wherein each cache storage line includes a valid bit indicating whether valid data is stored in that cache storage line.

7. Apparatus as claimed in claim 1, wherein said first prediction is stored as a one-bit value within said branch prediction memory.

8. Apparatus as claimed in claim 1, wherein said second prediction is stored as a one-bit value within said branch prediction cache.

9. Apparatus as claimed in claim 5, wherein when said branch prediction cache is full, a victim select circuit is operable to select a cache storage line to be overwritten based upon a round robin algorithm.

10. A method of processing data, said method comprising:
    executing program instructions including conditional branch instructions generating branch outcomes with a pipelined processing circuit; and
    generating predictions of branch outcomes of conditional branch program instructions to be executed by said pipelined processing circuit with a branch prediction circuit; and
    supplying a stream of program instructions to said pipelined processing circuit for execution in dependence upon said predictions with a prefetch circuit; wherein said step of generating comprises:
       storing a branch history value indicative of a preceding sequence of branch outcomes;
       addressing prediction memory storage locations within a branch prediction memory in dependence upon at least said branch history value, a prediction memory storage location addressed by a given branch history value being operable to store a first prediction of a branch outcome for a next branch instruction following a given preceding sequence of branch outcomes corresponding to said given branch history value;

storing within a branch prediction cache at least one branch history value together with a second prediction of a branch outcome for a next branch instruction following a preceding sequence of branch outcomes corresponding to said branch history value;

selecting for use by said prefetch circuit for a given history value either a second prediction when said branch prediction cache contains a second prediction for said given history value or a first prediction when said branch prediction cache does not contain a second prediction for said given history value; and in response to detection of an incorrect prediction based upon said first prediction from said branch prediction memory for said given history value, storing said given history value into said branch prediction cache together with a second prediction for said given history value.

11. A method as claimed in claim 10, wherein said second prediction initially stored within said branch prediction cache together with said given history value produces the same branch taken or branch not taken as said first prediction stored within said branch prediction memory which led to said incorrect prediction.

12. A method as claimed in claim 10, wherein in response to detection of an incorrect prediction based upon said second prediction from said branch prediction cache for said given history value changing said second prediction for said given history value.

13. A method as claimed in claim 10, wherein in response to detection of an incorrect prediction based upon said first prediction from said branch prediction memory for said given history value changing said first prediction for said given history value.

14. A method as claimed in claim 10, wherein said branch prediction cache comprises a plurality of cache storage lines each operable to store a history value together with a corresponding second prediction.

15. A method as claimed in claim 14, wherein each cache storage line includes a valid bit indicating whether valid data is stored in that cache storage line.

16. A method as claimed in claim 10, wherein said first prediction is stored as a one-bit value within said branch prediction memory.

17. A method as claimed in claim 10, wherein said second prediction is stored as a one-bit value within said branch prediction cache.

18. A method as claimed in claim 14, wherein when said branch prediction cache is full, a victim select circuit is operable to select a cache storage line to be overwritten based upon a round robin algorithm.

* * * * *